G. SCHLERETH.
SAUSAGE LINKER.
APPLICATION FILED MAY 31, 1918.

1,289,930.

Patented Dec. 31, 1918.

Inventor:
George Schlereth
By
Walter F. Murray
Attorney.

UNITED STATES PATENT OFFICE.

GEORGE SCHLERETH, OF CINCINNATI, OHIO.

SAUSAGE-LINKER.

1,289,930.  Specification of Letters Patent.  Patented Dec. 31, 1918.

Application filed May 31, 1918. Serial No. 237,395.

*To all whom it may concern:*

Be it known that I, GEORGE SCHLERETH, a citizen of the United States of America, and resident of Cincinnati, in the county of Hamilton and State of Ohio, have invented a new and useful Improvement in Sausage-Linkers, of which the following is a specification.

An object of my invention is to produce a sausage linking machine which is simple in construction and operation, which will not injure the sausage casing in the linking operation, and which is easily kept clean.

This and other objects are attained in the machine described in the following specification and illustrated in the accompanying drawing, in which.

Figure 2:
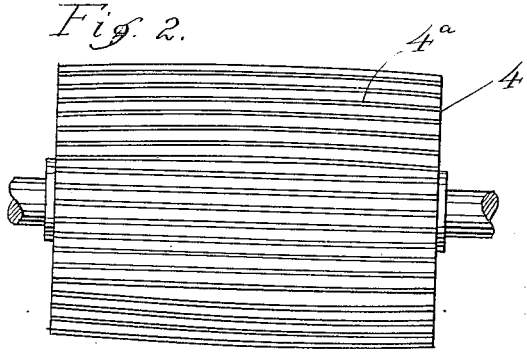
Fig. 2 is a side view of an element of my invention.
Figure 3:
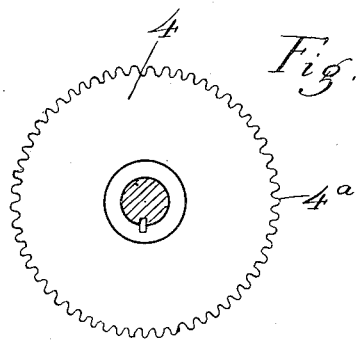
Fig. 3 is an end view of the element shown in Fig. 2.

My improved machine consists of a roll 4 rotatively mounted in bearings 5 and 6 upon a table 7 and driven by suitable means as by a belt 8 which receives motion from a drive shaft 9 beneath the table. Roll 4 is preferably provided with a fluted or corrugated surface 4ª, the edges of the elevated portions thereof being rounded as shown in Fig. 3. The surface of the roll is additionally shaped to have its central diameter larger than its end diameters, as shown in Fig. 2.

In using my improved machine the roll 4 is rotated at the proper speed and, while rotating, the stuffed casing is held in contact therewith, the hands of the operator being held at each end of a section of the required length of the stuffed casing necessary to produce a link of the required length. The action of the corrugations upon this length is to twist it with relation to the remainder of the casing and thus form the link 10 by squeezing the stuffing away from the twisted portions and forming twists 11 and 12 at the ends of the link as shown in Fig. 1.

Figure 1:
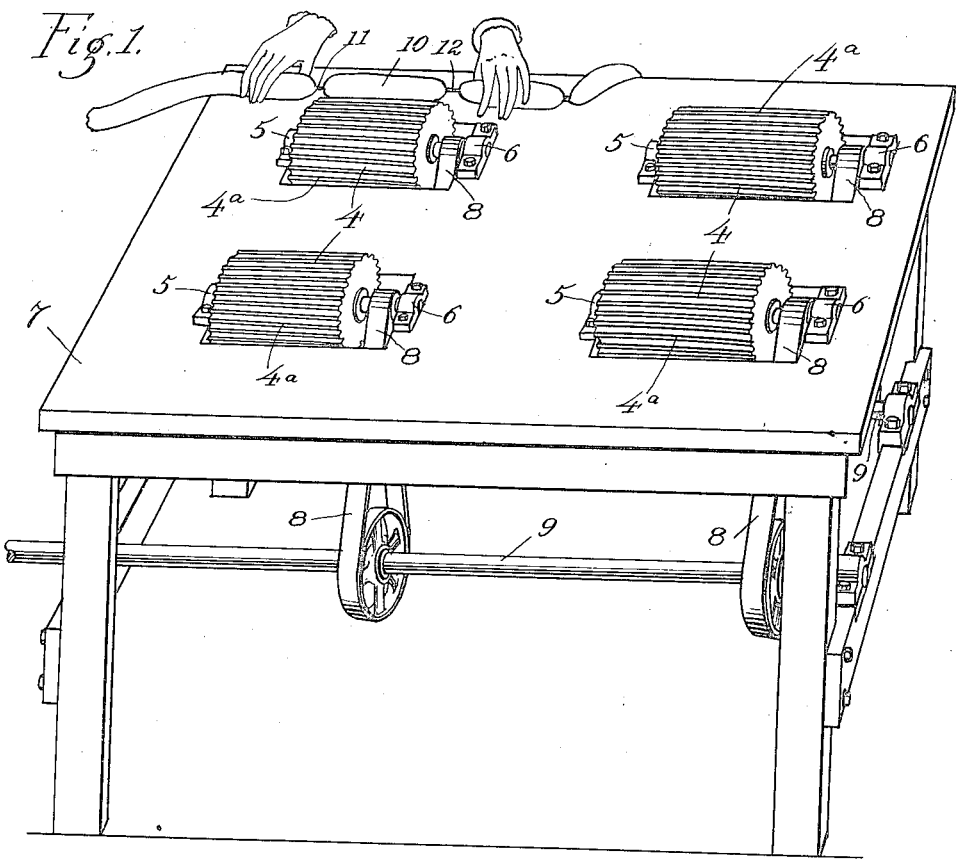
Figure 1 is a perspective view of a sausage linking machine embodying my invention.

In Fig. 1, I have shown a series of four machines embodying my invention, incorporated in a single table, each roll varying in length to form sausages of different lengths.

Having thus described my invention, what I claim is:

1. In a sausage linking machine the combination of a table having a slot in its top, a rotatable roll whose periphery when the roll is rotated is adapted to contact with a portion of a stuffed casing substantially equal to the length of the sausage to be formed, means for mounting the roll upon the table and with its operative periphery exposed through the slot above the table top and means for rotating the roll.

2. In a sausage linking machine the combination of a table having a slot in its top, a rotatable corrugated roll whose periphery when the roll is rotated is adapted to contact with a portion of a stuffed casing substantially equal to the length of the sausage to be formed, means for mounting the roll upon the table and with its operative periphery exposed through the slot above the table top and means for rotating the roll.

In testimony whereof, I have hereunto subscribed my name this 29th day of May, 1918.

GEORGE SCHLERETH.

Witnesses:
WALTER F. MURRAY,
W. THORNTON BOGERT.